United States Patent [19]

Dendy et al.

[11] 3,715,562
[45] Feb. 6, 1973

[54] COMPUTER FOR USE WITH RING LASER ROTATIONAL RATE SENSORS

[75] Inventors: Joe B. Dendy, Phoenix, Ariz.; Kenneth Thomson, Lloyd Neck; Robert F. Morrison, Halesite, both of N.Y.

[73] Assignee: Sperry Rand Corporation

[22] Filed: March 19, 1970

[21] Appl. No.: 20,965

[52] U.S. Cl. ..........235/150.31, 235/150.3, 235/156, 356/106 LR
[51] Int. Cl. ...........................G06f 15/20, G01b 9/02
[58] Field of Search.235/183, 150.25, 150.3, 150.31; 356/106 LR

[56] References Cited

UNITED STATES PATENTS

| | | | |
|---|---|---|---|
| 3,373,650 | 3/1968 | Killpatrick | 356/106 LR |
| 3,392,622 | 7/1968 | Senf | 356/106 LR |
| 3,512,890 | 5/1970 | McLaughlin | 356/106 LR |
| 3,597,088 | 8/1971 | Catherin | 356/106 LR |

*Primary Examiner*—Felix D. Gruber
*Attorney*—S. C. Yeaton

[57] ABSTRACT

A computer responsive to the pulse sequence output signal of a ring laser rotational rate sensor having contra-rotating beams and biasing means to prevent mode locking. The biasing means selectively changes the effective optical path length around the ring of one of the beams with respect to the other. The pulse repetition frequency of the laser output pulse sequence is representative of the difference in oscillation frequency between the contra-rotating beams. The computer comprises a bias control circuit for selecting the polarity of the bias applied to the ring and includes a compensation circuit for providing a bias compensation pulse sequence whose pulse repetition frequency is representative of the magnitude of the applied bias. The computer in addition provides signals representative of the polarities of the laser output pulse sequence and the bias compensation pulse sequence respectively. The laser polarity is chosen in accordance with the selected polarity of the applied bias. The polarity of the bias compensation pulse sequence is chosen opposite to the selected laser polarity. A pulse sequence combining circuit is included for combining the laser output pulse sequence and the bias compensation pulse sequence thereby providing a combined pulse sequence. The pulse sequence combining circuit furthermore combines the associated polarity signals thereby providing a combined polarity signal. The combined pulse sequence is integrated in accordance with the combined polarity signal for providing a signal representative of the ring about an axis normal thereto.

22 Claims, 7 Drawing Figures

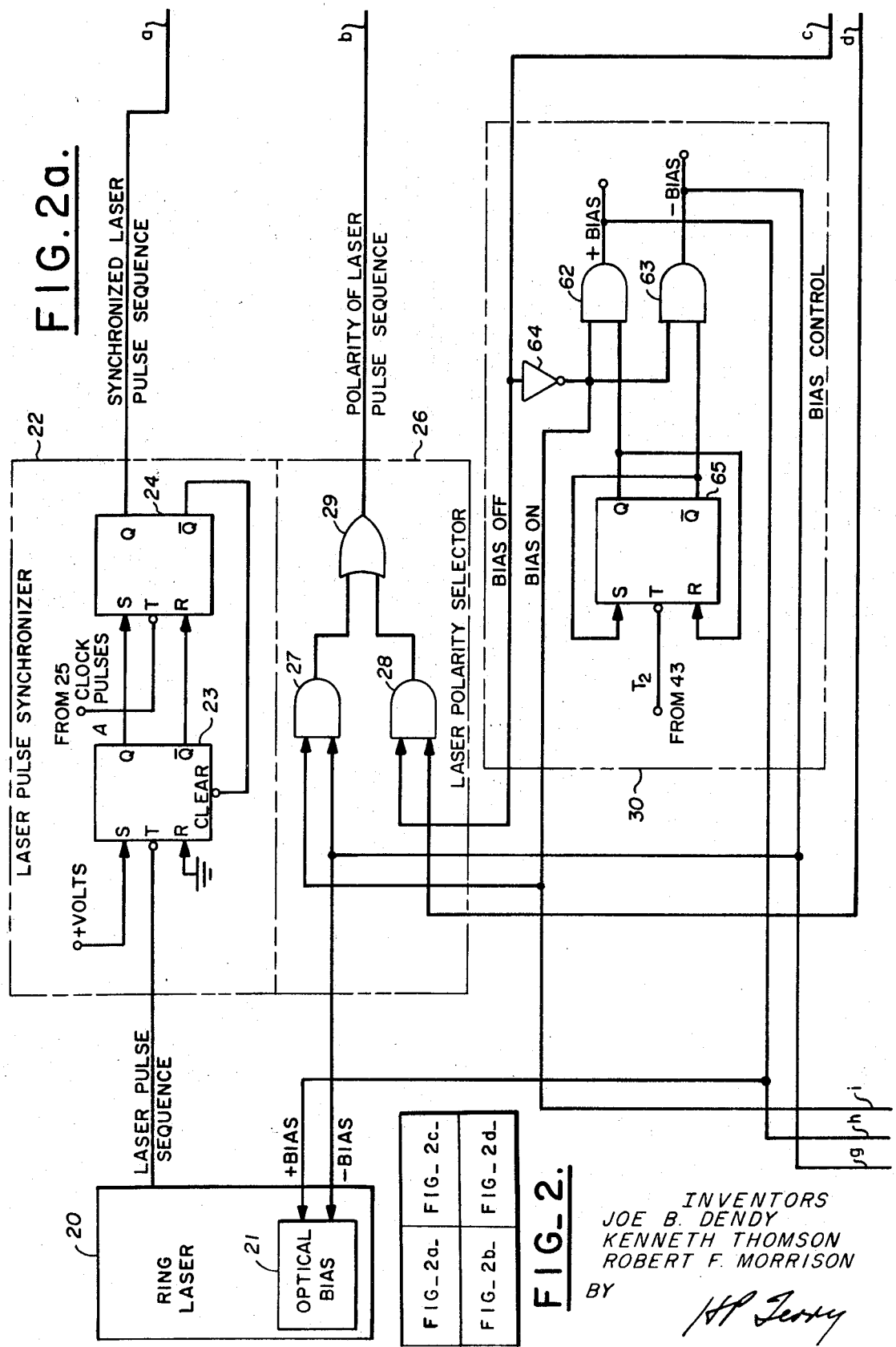

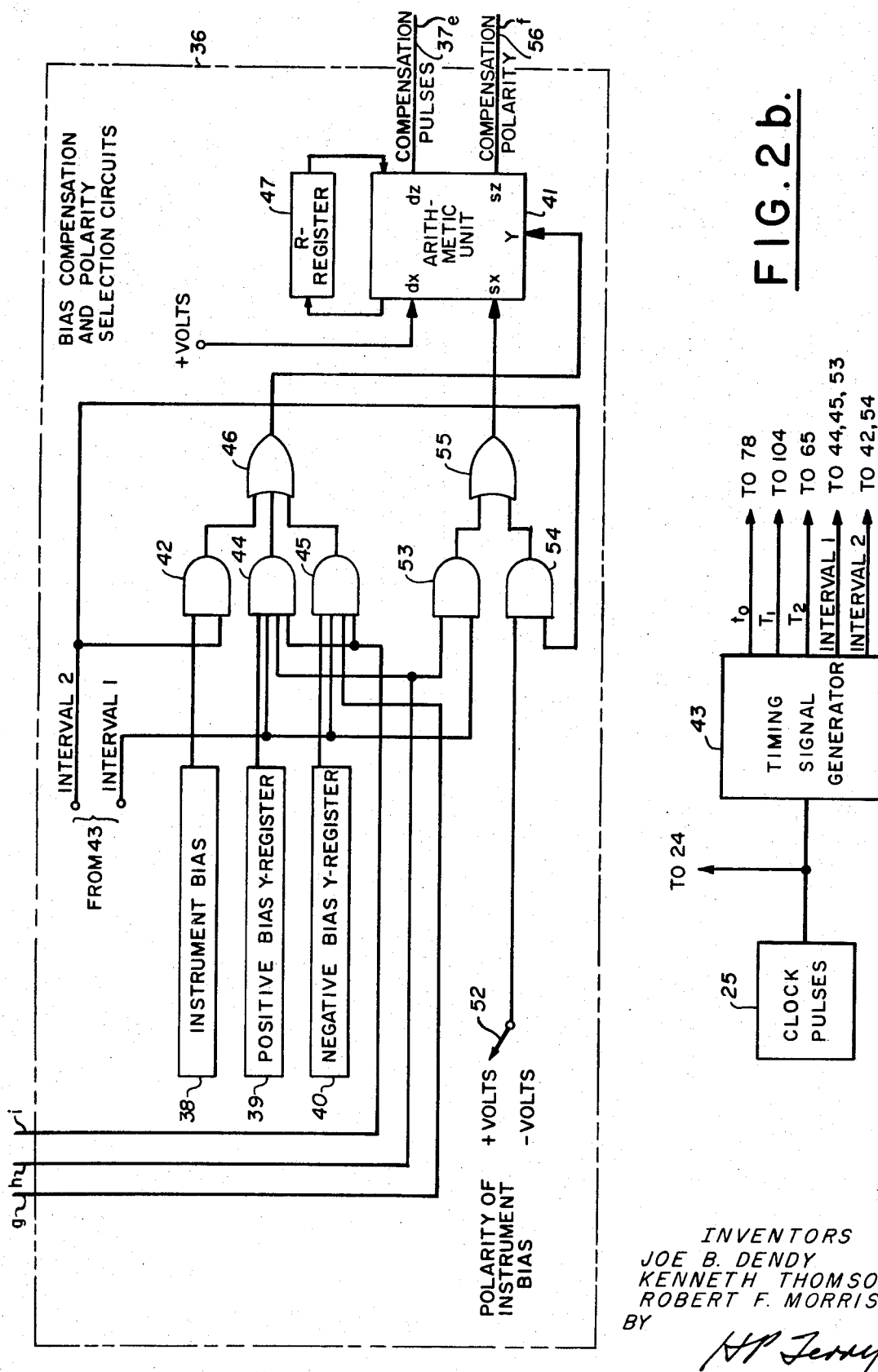

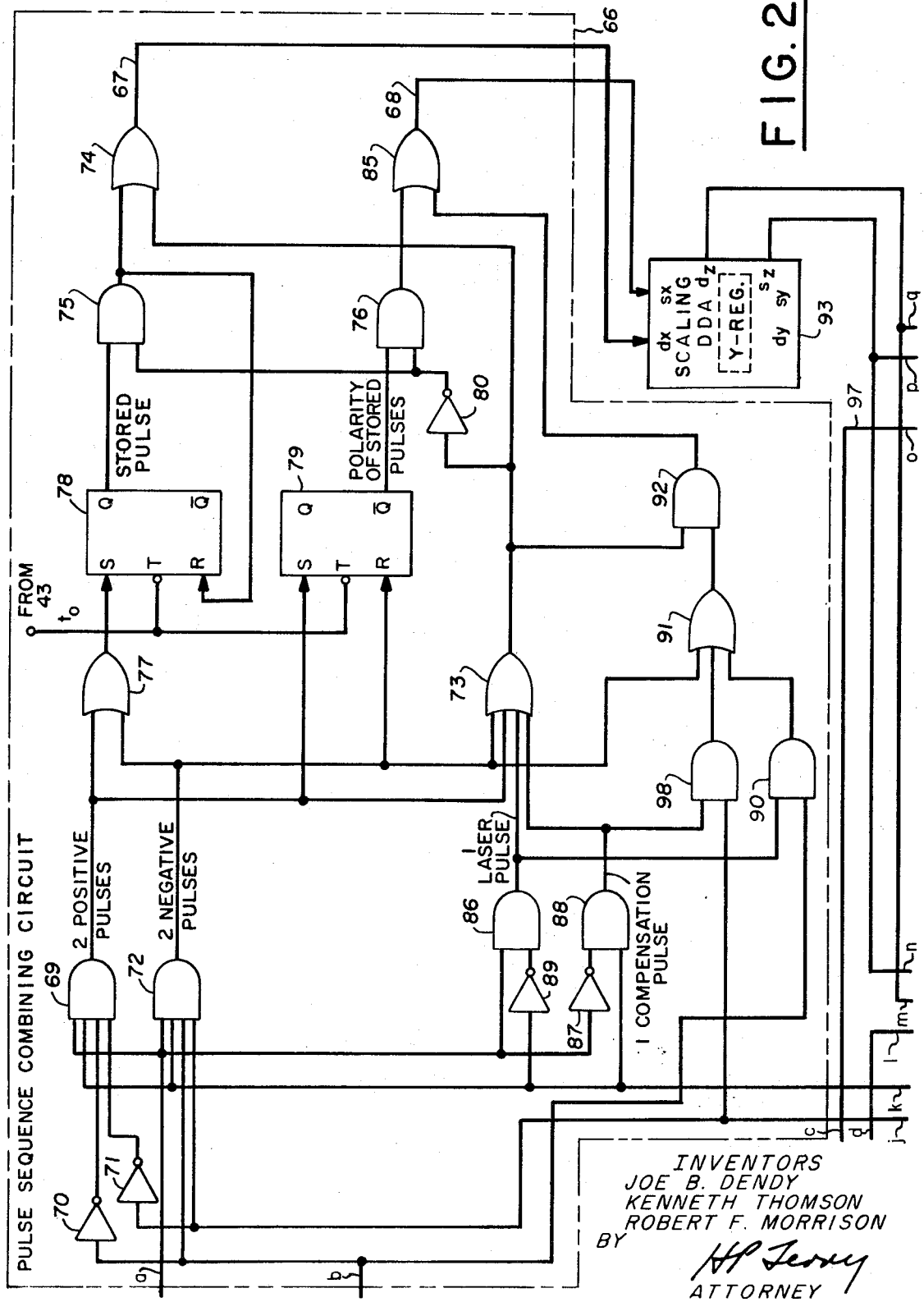

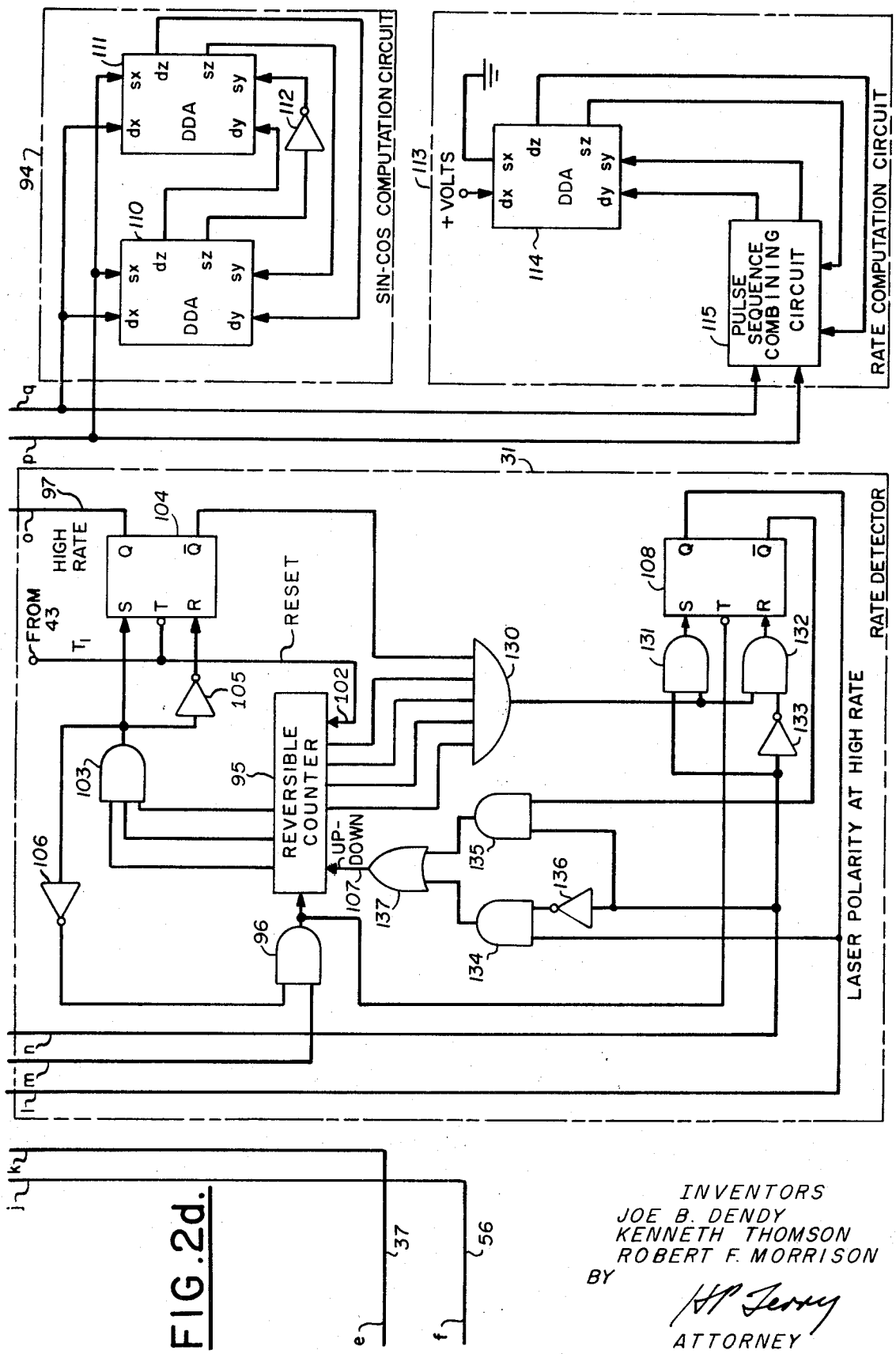

COMPUTER FOR USE WITH RING LASER ROTATIONAL RATE SENSORS

BACKGROUND OF THE INVENTION

1. Field of the Invention

The present invention relates to ring laser rotational rate sensor systems.

2. Description of the Prior Art

Prior art ring laser rotational rate sensor systems measure the magnitude of the angular rotation of the ring about an axis normal thereto by combining portions of the contra-rotating beams of the ring laser on the photosensitive surface of a photodetector and measuring the beat frequency resulting therefrom. A known technique for determining the sense of the rotation of the ring is to utilize a second photodetector comparing the phase relationship between the beat frequency signal therefrom and the beat frequency signal from the first photodetector. The use of a second photodetector increases the undesired backscattering phenomenon with respect to a single photodetector configuration thereby increasing the mode locking threshold of the ring laser.

Ring laser configurations are known utilizing a single photodetector in the combining optics associated therewith, wherein the direction of rotation is determined by complex bias switching procedures and computations.

SUMMARY OF THE INVENTION

The present invention comprises a computer responsive to the pulse sequence output signal of a ring laser rotational rate sensor having contra-rotating beams and biasing means for selectively changing the effective optical path length around the ring of one of the beams with respect to the other. The pulse repetition frequency of the laser output pulse sequence is representative of the difference in oscillation frequency between the contra-rotating beams.

The computer determines the magnitude and sense of the rate of rotation of the ring about an axis normal thereto from the signal provided by a single photodetector in the combining optics of the laser. The computer provides unique polarity selection means for determining the sense of rotation of the ring.

The computer comprises a bias control circuit for selecting the polarity of the bias applied to the ring and includes a compensation circuit for providing a bias compensation pulse sequence whose pulse repetition frequency is representative of the magnitude of the applied bias. The computer in addition provides signals representative of the polarities of the laser output pulse sequence and the bias compensation pulse sequence respectively. The laser polarity is chosen in accordance with the selected polarity of the applied bias. The polarity of the bias compensation pulse sequence is chosen opposite to the selected laser polarity. A pulse sequence combining circuit is included for combining the laser output pulse sequence and the bias compensation pulse sequence thereby providing a combined pulse sequence. The pulse sequence combining circuit furthermore combines the associated polarity signals thereby providing a combined polarity signal. The combined pulse sequence is integrated in accordance with the combined polarity signal for providing a signal representative of the rate and direction of rotation of the ring about an axis normal thereto.

The bias may be applied at low rates of rotation of the ring to prevent mode locking and the bias polarity may be periodically alternated to minimize long-term drift errors.

BRIEF DESCRIPTION OF THE DRAWINGS

FIGS. 2a, b, c and d, taken together as indicated in FIG. 2 is a block schematic diagram of a preferred embodiment of the present invention.

DESCRIPTION OF THE PREFERRED EMBODIMENT

Figure 1:
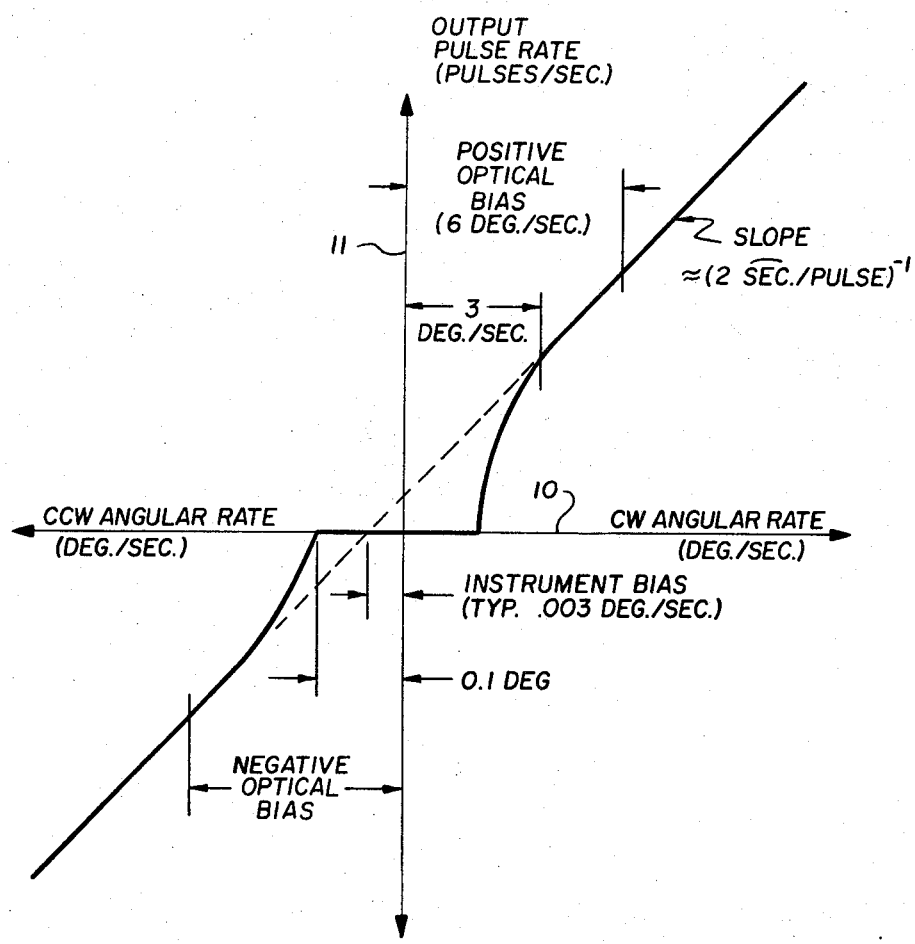
FIG. 1 is a graph illustrating the input/output characteristics of a typical ring laser.

Referring to FIG. 1, the input-output characteristic of a typical ring laser is illustrated. Abscissa axis 10 represents the angular rate of rotation of the ring about an axis normal thereto. The section of the abscissa axis 10 to the right of the origin is representative of clockwise rotation and the section thereof to the left of the origin is representative of counterclockwise rotation. Clockwise rotation may be designated as having a positive polarity and counterclockwise rotation may be designated as having a negative polarity.

Ordinate axis 11 represents the frequency of the laser output pulse sequence, which frequency is representative of the rotational rate of the ring. The section of the ordinate axis 11 above the origin is representative of positive frequencies and the section of the axis 11 below the origin is representative of negative frequencies. It will be appreciated that negative frequencies do not have physical significance but that the polarity of the frequency is a designation applied by the computer of the present invention to the laser output pulse sequence so as to determine the sense of rotation of the ring, in a manner to be explained.

Ideally, the input-output characteristic of a ring laser should be a linear curve intersecting the origin. The input-output characteristic illustrated in FIG. 1, however, exhibits non-linear properties on both sides of the origin. It is understood that these non-linearities are caused by the well-known mode-locking characteristic of ring lasers at low rates of rotation of the ring. The present invention provides bias polarity selection techniques utilized in conjunction with biasing procedures for negating the effect of the mode-locking phenomenon and for providing an accurate indication of the rate of rotation and the sense thereof of the ring at low rotation rates, in a manner to be explained.

Ideally, a linear extension of the linear portions of the input-output characteristic of a ring laser should intersect the origin. However, the linear extension illustrated in FIG. 1 by the dashed line is offset from the origin. This offset is caused by asymmetries inherent in practical ring laser configurations. Means are provided by the present invention to negate the effect of these asymmetries, in a manner to be explained.

Referring now to FIG. 2, a conventional ring laser 20 is illustrated including optical biasing apparatus 21 which selectively changes the effective optical path length of one of the laser beams with respect to the other for the purpose of preventing mode-locking. The optical biasing apparatus 21 may, for example, comprise a conventional Faraday biasing cell. Such an arrangement may be exemplified by the devices of U.S. Pat. No. 3,373,650 "Laser Angular Rate Sensor" by J.E. Killpatrick issued Mar. 19, 1968 or U.S. Pat. No. 3,392,622 "Electromagnetic Rotation Sensor" by H. R. Senf, issued July 16, 1968. The ring laser 20 may be mounted to the body of a vehicle for navigational purposes. The ring laser 20 provides a laser output pulse sequence generally to a laser pulse synchronizer 22.

The output pulses from the laser 20 occur asynchronously with respect to the clock pulses of the computer of the present invention. The laser pulse synchronizer 22 provides pulses, in a manner to be explained, which occur synchronously with respect to the computer clock pulses and correspond in a one-to-one manner to the asynchronous laser pulses.

The laser pulse synchronizer 22 includes a flip flop 23 having a trigger input to which the pulse sequence from the laser 20 is applied. A binary ONE signal is applied to the set input of the flip flop 23 which signal may be represented by a positive voltage as indicated by the legend. A binary ZERO signal is applied to the reset input of the flip flop 23 which signal may be represented by ground potential. With these connections, the flip flop 23 is set to the Q state in response to the falling edge of a pulse applied to its trigger input. The Q and the $\bar{Q}$ outputs of the flip flop 23 are connected respectively to the set and the reset input of a flip flop 24. Clock pulses from a conventional clock pulse source 25 are applied to the trigger input of the flip flop 24. With these connections, the flip flop 24 is set to the Q state or the $\bar{Q}$ state in response to the falling edge of a clock pulse applied to its trigger input when the flip flop 23 is in the Q state or in the $\bar{Q}$ state respectively. The $\bar{Q}$ output of the flip flop 24 is connected to the clear input of the flip flop 23 whereby the flip flop 23 will be reset to the $\bar{Q}$ state whenever the flip flop 24 is set to its Q state. The Q output of the flip flop 24 provides a laser pulse sequence synchronized with respect to the clock pulses of the computer in a manner to be explained.

A laser polarity selector circuit 26 is included in the computer of the present invention for providing a signal representative of the polarity of the laser pulse sequence. The laser polarity selector circuit 26 is comprised of AND gates 27 and 28 and an OR gate 29. The inputs to the AND gate 27 receive signals from a bias control circuit 30. The AND gate 28 is also responsive to the bias control circuit 30 and in addition receives an input from a rate detector circuit 31. The outputs of the AND gates 27 and 28 are applied as inputs to the OR gate 29. The OR gate 29 provides the signal representative of the polarity of the laser pulse sequence for reasons and in a manner to be explained.

Bias compensation and polarity selection circuits 36 are included in the computer of the present invention for providing a bias compensation pulse sequence on conductor 37 whose pulse repetition frequency is representative of the magnitude of the optical bias applied to the ring laser 20 by the optical biasing apparatus 21. The bias compensation and polarity selection circuits 36 comprise apparatus of the digital differential analyzer type wherein Y-registers 38, 39 and 40 selectively provide predetermined binary numbers to an arithmetic unit 451, in a conventional manner, for selective accumulation in an R-register 47, thereby selectively providing an instrument compensation pulse sequence, a positive bias compensation pulse sequence or a negative bias compensation pulse sequence, respectively, on conductor 37 in a manner to be explained.

The bias compensation and polarity selection circuits 36 comprise instrument bias Y-register 38 which stores a predetermined binary number representative of the magnitude of the zero offset of the laser input-output characteristic as previously described with respect to FIG. 1. The register 38 provides the binary number stored therein as an input to an AND gate 42. A conventional timing signal generator 43, which receives clock pulses from the clock pulse source 25, provides an interval 2 signal, illustrated in FIG. 3, as an input to the AND gate 42.

A positive bias Y-register 39, which stores a predetermined binary number representative of the magnitude of the positive optical bias applied to the ring laser 20 by the optical bias apparatus 21, provides the binary number as an input to an AND gate 44. The AND gate 44 in addition receives an interval 1 signal, illustrated in FIG. 3, from the timing signal generator 43. The AND gate 44 also receives signals from the bias control circuit 30 in a manner to be described.

A negative bias Y-register 40, which stores a predetermined binary number representative of the magnitude of the negative optical bias applied to the ring laser 20 by the optical bias apparatus 21, provides the binary number as an input to an AND gate 45. The AND gate 45 in addition receives the interval 1 signal in a manner similar to that described with respect to the AND gate 44. The AND gate 45 also receives signals from the bias control circuit 30 in a manner to be described.

The AND gates 42, 44 and 45 provide input signals to an OR gate 46. The signal provided by the OR gate 46 to the Y-input of the arithmetic unit 41 is selectively representative of the binary numbers stored in the Y-registers 38, 39 and 40 in accordance with the timing signals provided by the timing signal generator 43 and the bias control signals provided by the bias control circuit 30.

The arithmetic unit 41 and an R-register 47 comprise a circuit of the conventional digital differential analyzer type commonly sharing the Y-registers 38, 39 and 40. The $dx$ input to the arithmetic unit 41 is provided from a source of positive voltage which is representative of a binary ONE signal for reasons to be explained.

The apparatus 36 includes polarity selection circuits comprising an instrument bias polarity selection switch 52 with associated sources of potential indicated by the legend, AND gates 53 and 54, an OR gate 55, as well as the circuits included in the arithmetic unit 41 for providing a compensation polarity signal on a conductor 56 in a manner to be explained.

The AND gate 53 receives as inputs a signal from the bias control circuit 30 and the interval 1 signal from the timing signal generator 43. The AND gate 53 provides a signal representative of the opposite polarity to that of the optical bias applied by the optical bias apparatus 21 to the ring laser 20, in a manner to be described.

The AND gate 54 receives a signal from the switch 52 as well as the interval 2 signal from the timing signal generator 43. The AND gate 54 provides a signal representative of the polarity of the instrument bias selected by the switch 52 in a manner to be described.

The AND gates 53 and 54 provide input signals to an OR gate 55 which in turn provides a signal to the *sx* input of the arithmetic unit 41. The signal provided to the *sx* input of the arithmetic unit 41 is selectively representative of the polarity of the instrument bias or of a polarity opposite to that of the applied optical bias in accordance with the bias control signals provided by the bias control circuit 30 and the timing signals provided by the timing signal generator 43 in a manner to be explained.

The arithmetic unit 41, in turn, provides the compensation polarity signal on the conductor 56 in a manner to be described.

As previously explained, the optical bias apparatus 21, the laser polarity selector 26 and the bias compensation and polarity selection circuits 36 receive bias control signals from the bias control circuit 30. The bias control circuit 30 generally receives an input signal from the rate detector 31. The signal from the rate detector 31 is applied as inputs to AND gates 62 and 63 via an inverter 64. The AND gates 62 and 63 provide the bias control signals previously mentioned in a manner to be described.

Figure 3:
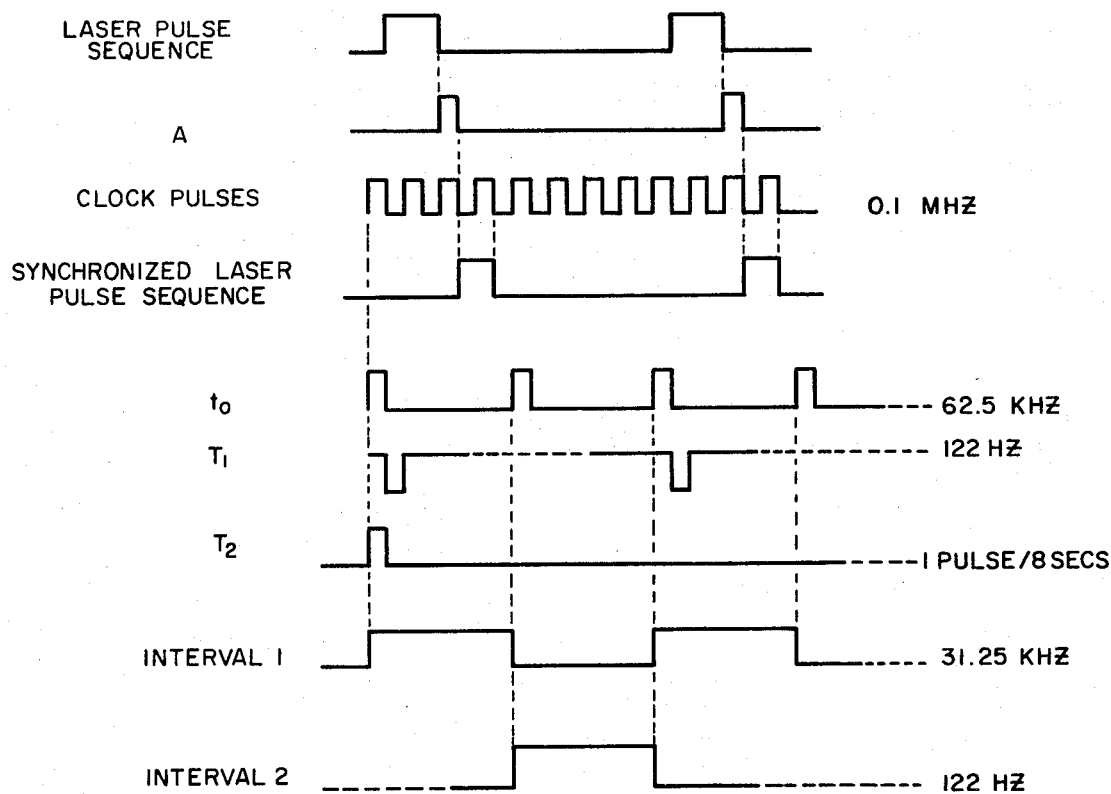
FIG. 3 is a timing diagram illustrating waveforms useful in explaining the operation of the apparatus of FIG. 2.

The AND gates 62 and 63 also receive inputs from the Q and $\bar{Q}$ outputs respectively of a flip flop 65. The Q and the $\bar{Q}$ outputs of the flip flop 65 are also connected, respectively, to the reset and the set input thereof. With these connections the flip flop 65 toggles in response to pulses applied to the trigger input thereof. The trigger input to the flip flop 65 is responsive to the timing signal $T_2$, as illustrated in FIG. 3 from the timing signal generator 43.

The laser pulse sequence provided by the laser pulse synchronizer 22, the polarity signal provided by the laser polarity selector 26, the bias compensation pulse sequence appearing on the conductor 37 and the compensation polarity signal appearing on the conductor 56 are applied generally as inputs to a pulse sequence combining circuit 66. The pulse sequence combining circuit 66 provides a pulse on a conductor 67 for each singly occurring laser pulse or bias compensation pulse and provides the polarity signal associated therewith on a conductor 68. Laser and bias compensation pulses that occur simultaneously with respect to each other and have opposite associated polarities with respect to each other are cancelled by the pulse sequence combining circuit 66. When a laser pulse and a bias compensation pulse occur simultaneously with respect to each other but have the same associated polarity with respect to each other, one of the pulses is transmitted to the conductor 67 with the associated polarity signal appearing on conductor 68, and the other pulse with the associated polarity signal is stored for transmission thereafter in a manner to be explained.

The pulse sequence combining circuit 66 includes an AND gate 69 which receives the laser pulse sequence provided by the laser pulse synchronizer 22 as an input signal. A second input signal is provided to the AND gate 69 by the bias compensation pulses appearing on the conductor 37. A third input to the AND gate 69 is provided via an inverter 70 by the polarity signal from the laser polarity selector 26 and a fourth input is provided thereto via an inverter 71 by the compensation polarity signal appearing on the conductor 56. The AND gate 69 provides a signal whenever a positive laser pulse and a positive bias compensation pulse occur simultaneously with respect to each other, in a manner to be explained.

An AND gate 72 receives an input signal from the laser pulse sequence provided by the laser pulse synchronizer 22. A second input to the AND gate 72 is provided by the bias compensation pulses appearing on the conductor 37. The third and fourth inputs to the AND gate 72 are provided respectively by the polarity signal from the laser polarity selector 26 and the compensation polarity signal appearing on the conductor 56. The AND gate 72 provides a signal whenever a negative laser pulse and a negative bias compensation pulse occur simultaneously with respect to each other, in a manner to be described.

The AND gates 69 and 72 provide inputs to an OR gate 73. The OR gate 73, in turn, provides a signal to an OR gate 74 whose output is the conductor 67 previously discussed. Whenever laser and bias compensation pulses having the same associated polarity with respect to each other, occur simultaneously with respect to each other, a pulse is provided on the conductor 67 in a manner to be described.

The AND gate 72 also provides a signal to an OR gate 91 thus providing a signal on the conductor 68 via an AND gate 92 and an OR gate 85 which signal is representative of the polarity of the pulse provided on the conductor 67, in a manner to be explained. The output of the OR gate 73 in addition provides an inhibiting signal via an inverter 80 to AND gates 75 and 76 for reasons to be discussed.

The outputs from the AND gates 69 and 72 are combined in an OR gate 77 which provides a signal to the set input of a slip flop 78. The flip flop 78 is utilized to store one pulse of each pair of laser and bias compensation pulses occurring simultaneously with respect to each other having the same polarity with respect to each other and for transmitting the stored pulse via the AND gate 75 and the OR gate 74 to the conductor 67 after the other pulse of the pair has been transmitted thereon in a manner to be explained.

The output of the AND gate 75 is connected to the reset input of the flip flop 78 for resetting the flip flop 78 after the pulse stored therein has been transmitted through the AND gate 75. The pulses of the waveform $t_0$, as illustrated in FIG. 3, are applied from the timing signal generator 43 to the trigger of the flip flop 78 for entering thereinto the binary conditions appearing at the set and reset inputs thereof.

The outputs of the AND gates 69 and 72 are applied respectively to the set and reset inputs of a flip flop 79. The pulses of the waveform $t_0$ provided by the timing signal generator 43 are applied to the trigger input of the flip flop 79 thereby to store a positive polarity or a negative polarity in accordance with the polarity of the simultaneously occurring laser and bias compensation pulses in a manner to be explained. The $\bar{Q}$ output of the flip flop 79 provides a signal representative of the stored polarity to the conductor 68 via the AND gate 76 and the OR gate 85 in a manner to be explained.

The laser pulses are applied directly as an input to an AND gate 86 and via an inverter 87 as an input to an AND gate 88. Similarly, the bias compensation pulses are applied directly as an input to the AND gate 88 and via an inverter 89 as an input to the AND gate 86. The AND gate 86 provides a signal representative of a singly occurring laser pulse and the AND gate 88 provides a signal representative of a singly occurring bias compensation pulse. The outputs of the AND gates 86 and 88 are applied as inputs to the OR gate 73 which in turn provides a signal to the conductor 67 via the OR gate 74 in a manner and for reasons to be explained.

The output signal from the AND gate 86 and the polarity signal provided by the laser polarity selector 26 provide inputs to an AND gate 90. Similarly, the output signal from the AND gate 88 and the compensation polarity signal provided on the conductor 56 provide inputs to an AND gate 98. The AND gates 90 and 98 provide input signals to the OR gate 91 which also receives an input signal from the AND gate 72. The OR gate 91 provides an input signal to the AND gate 92 which also receives an input signal from the OR gate 73. The output of the AND gate 92 is in turn connected as an input to the OR gate 85. The AND gates 90, 92 and 98 and the OR gates 85 and 91 provide a signal to the conductor 68 which is representative of the polarity of the singly occurring laser and bias pulses applied to the pulse sequence combining circuits 66 in a manner to be explained.

The signals appearing on the conductor 67 are representative of a combined pulse sequence obtained from the laser pulse sequence provided by the laser pulse synchronizer 22 and the bias compensation pulse sequence provided by the bias compensation and polarity selection circuits 36. The signal appearing on the conductor 68 is a combined polarity signal representative of the polarity associated with the pulses appearing on the conductor 67.

The combined pulse sequence appearing on the conductor 67 and the combined polarity signal appearing on the conductor 68 are applied respectively to the *dx* and the *sx* inputs of a scaling integrator 93. The scaling integrator 93 may be a conventional digital differential analyzer circuit of the type described in Design Of A One Megacycle Iteration Rate DDA, *Proceedings* 1962 *Spring Joint Computer Conference*, AFIPS, Vol. 21, pp. 353–364, Bradley, R. E., and Genna, J. F. An additional reference may be found in Real Time Digital Differential Analyzer (DART), *Proceedings* 1954 *Western Joint Computer Conference*, pp. 134–139, Meissner, L. P.

The scaling factor selected for the Y-register of the integrator 93 is chosen so that the pulses applied to a following sine-cosine computation circuit 94 may be utilized directly thereby without requiring further scaling in the integrators associated therewith.

The *dz* and *sz* outputs of the scaling integrator 93 are applied generally as inputs to the rate detector 31. The rate detector 31 provides a signal on a conductor 97 to the bias control circuit 30 whenever the magnitude of the rate of rotation of the ring laser equals or exceeds a predetermined value. The *dz* output of the scaling integrator 93 is provided to a reversible counter 95 via an AND gate 96. The up-down control of the counter 95 is provided by an up-down control input 107 via a binary signal applied thereto. The counter 95 may be a conventional reversible counter providing a binary digital output signal representative of the number of pulses applied to its input from the AND gate 96. The counter conveniently may be conditioned to count up by a binary ZERO signal applied to its up-down control input 107 and may similarly be conditioned to count down by a binary ONE signal applied thereto. The counter may be reset to an initial condition, such as zero, by a signal applied to a reset input 102. For reasons to be explained, the resetting of the counter 95 may be slightly delayed, by conventional means not shown, in response to the signal on the resetting input 102.

The inputs to an AND gate 103 are connected to predetermined output terminals of the reversible counter 95 thereby providing a signal whenever the reversible counter 95 attains a predetermined count. The output of the AND gate 103 is connected directly to the set input of a flip flop 104 and through an inverter 105 to the reset input thereof. The $T_1$ signal, illustrated in FIG. 3, from the timing signal generator 43, is applied to the trigger input of the flip flop 104 for inserting the binary condition provided by the AND gate 103 into the flip flop 104 in a manner to be described. The $T_1$ signal is also applied as the resetting signal to the reset terminal 102 of the reversible counter 95. The Q output of the flip flop 104 provides a signal on the conductor 97 to the bias control circuit 30 whenever the reversible counter 95 attains the aforementioned predetermined count. The reversible counter 95 attains the predetermined count whenever the rate of rotation of the ring laser equals or exceeds a predetermined magnitude.

The output of the AND gate 103 is also connected as an inhibiting input to the AND gate 96 via an inverter 106 for reasons to be explained.

The inputs to an AND gate 130 are connected to the output terminals of the reversible counter 95, in a conventional configuration, whereby the AND gate 130 provides a signal whenever the reversible counter 95 attains a count of zero. An additional enabling input to the AND gate 130 is provided by the $\bar{Q}$ output of the flip flop 104, for reasons to be explained.

The output of the AND gate 130 provides input signals to AND gates 131 and 132. The AND gate 131 also receives an input signal from the *sz* output of the scaling integrator 93 and the AND gate 132 similarly receives an input signal, via an inverter 133, from the *sz* output thereof. The AND gates 131 and 132 in turn provide signals to the set and reset inputs of a flip flop 108 respectively. The pulses from the AND gate 96 provide the triggering signals to the trigger input of the flip flop 108. In a manner to be described, the flip flop 108 stores the polarity signal associated with the pulse provided by the AND gate 96 to the reversible counter 95 that caused the counter 95 to attain the aforementioned predetermined count. The Q output from the flip flop 108 provides the laser polarity signal to the laser polarity selector 26 in a manner to be explained whenever the rate of rotation of the ring laser equals or exceeds the predetermined magnitude.

The Q and the $\bar{Q}$ outputs of the flip flop 108 provide input signals to AND gates 134 and 135 respectively. The AND gate 135 also receives an input signal from the *sz* output of the scaling integrator 93 and the AND gate 134 receives the inverse thereof via an inverter 136. The outputs of the AND gates 134 and 135 provide input signals to an OR gate 137. The OR gate 137 provides the aforementioned binary up-down control signal on the conductor 107 to the reversible counter 95.

The gates 134, 135, 136 and 137 are so arranged that the reversible counter 95 is not permitted to count down through zero. Whenever the counter 95 attains a count of zero, the gates 134 through 137 provide a count up binary ZERO command on the conductor 107. The gates 134 through 137 and the counter 95 are arranged in this manner so that the aforementioned predetermined count may represent the same magnitude of the rate of rotation of the ring 20 irrespective of the sense of rotation thereof. Thus, the AND gate 103 may be responsive to this aforementioned predetermined count to detect when the rate of rotation of the ring equals or exceeds the aforementioned predetermined magnitude for both positive and negative directions of rotation of the ring 20 in a manner to be discussed.

As well as providing inputs to the rate detector circuit 31, the scaling integrator 93 provides input signals generally to the sine-cosine computation circuit 94. The sine-cosine computation circuit 94 may be comprised of conventional integrators of the digital differential analyzer type such as have previously been referenced with respect to the DDA 93. The integrators 110 and 111 may be connected in a conventional manner to provide signals representative of the sine and the cosine of the input signals applied thereto. The $dz$ and $sz$ outputs provided by the scaling integrator 93 are applied respectively in parallel to the $dx$ and $sx$ inputs to the integrators 110 and 111. The $dz$ and $sz$ outputs of the integrator 111 are connected respectively to the $dy$ and $Sy$ inputs of the integrator 110. Similarly the $dz$ output of the integrator 110 is connected to the $dy$ input of the integrator 111 whereas the $sz$ output of the integrator 110 is connected to the $Sy$ input of the integrator 111 via an inverter 112. With the connections described, the integrators 110 and 111 provide the sine and the cosine respectively of the input signals applied thereto in a conventional manner.

The $dz$ and $sz$ output signals from the scaling integrator 93 are provided generally as inputs to a rate computation circuit 113. The rate computation circuit 113 converts the scaled laser pulse rate to a binary number representative of the sense and magnitude of the rate of rotation of the ring laser 20. The rate computation circuit 113 is comprised of a conventional integrator 114 of the digital differential analyzer type previously referenced and a pulse sequence combining circuit 115 which may be identical to the circuit 66 which has been previously described. The binary number representing rate of rotation of the laser is stored in the Y-register of the DDA integrator 114.

The laser pulse rate which is representative of the laser rate of rotation is converted to a binary number representative of the laser rate of rotation in the following manner. The $dx$ and $sx$ inputs to the integrator 114 are wired to + volts and ground, respectively, which are representative, respectively, of binary ONE and binary ZERO. This causes the integrator to integrate with respect to time, and the output pulse rate $dz$ to be proportional to the number stored in the Y-register, the polarity $sz$ being the same as that of the number in the Y-register. This pulse rate is subtracted from the laser pulse rate provided by the scaling DDA 93 in the pulse sequence combining circuit 115. The difference pulse rate is coupled to the $dy$ input of integrator 114 and is integrated into the Y-register. Under steady state conditions, the difference pulse rate will be zero and the integrator output pulse rate will be equal to the input pulse rate from the scaling DDA 93. Hence, the binary number in the Y-register of the integrator is proportional to the laser pulse rate from the scaling integrator 93, and is thus representative of the magnitude and sense of the ring laser rate of rotation.

In operation the ring laser 20 provides the laser pulse sequence, as illustrated in FIG. 3, to the laser pulse synchronizer 22. The pulses from the ring laser 20 may result from either mechanical rotation of the ring about an axis normal thereto or from optical bias provided by means of the optical bias apparatus 21 or from a combination of the two. Laser pulses may additionally be provided by reason of the instrument zero offset. The falling edge of each pulse of the laser pulse sequence triggers the flip flop 23 to the Q state as illustrated by waveform A and the laser pulse sequence waveform of FIG. 3. The falling edge of the next occurring clock pulse from the clock pulse source 25 consequently triggers the flip flop 24 to the Q state. The $\bar{Q}$ output of the flip flop 24 then clears the flip flop 23 to the $\bar{Q}$ state as illustrated by the waveform A, the clock pulse waveform and the synchronized laser pulse sequence waveform of FIG. 3. The falling edge of the next occurring clock pulse then resets the flip flop 24 back to the $\bar{Q}$ state thereby providing a pulse corresponding to the pulse from the ring laser 20 but synchronized with the computer clock pulse source 25 as illustrated by the synchronized laser pulse sequence waveform of FIG. 3. Components of the laser pulse synchronizer 22 are now conditioned to receive the next occurring pulse from the ring laser 20.

The bias control circuit 30 provides control signals to various components of the computer of the present invention in response to a signal on the conductor 97 from the rate detector 31. This signal is representative of the condition whereby the rate of rotation of the ring is equal to or greater than a predetermined rate. The manner in which the signal on the conductor 97 is generated will be explained later with respect to the operation of the rate detector 31. Whenever the rate of rotation of the ring is equal to or greater than the predetermined rate, the signal on the conductor 97 assumes the binary ONE state and whenever the rate of rotation of the ring is less than the predetermined rate, the signal on the conductor 97 assumes the binary ZERO state. Therefore, when the rate of rotation of the ring is less than the predetermined rate, the inverter 64 of the bias control circuit 30 provides an enabling signal to the AND gates 62 and 63. Since the flip flop 65 is continuously toggling in response to the $T_2$ signal provided by the timing signal generator 43, the AND gates 62 and 63 are alternately enabled thereby alternately providing the + bias and the − bias signals to the optical bias apparatus 21 as indicated by the legend. Thus, whenever the rate of rotation of the ring is less than the predetermined rate, alternating positive and negative optical bias is applied to the ring laser 20 by means of the optical bias apparatus 21 in a well known manner. As is well appreciated in the ring laser art, the optical bias may be applied to prevent mode locking. As is furthermore understood in the ring laser art, the applied bias may be alternated between positive and negative polarities to reduce drift in the rotational data provided by the ring laser 20. Whenever the rate of rotation of the ring is equal to or greater than the predetermined rate, which is selected just beyond the mode locking region illustrated in FIG. 1, the binary ZERO signal provided by the inverter 64 disables both the AND gates 62 and 63 thereby de-energizing the optical bias apparatus 21. Thus, in summary, whenever the rate of rotation of the ring is less than the predetermined rate, alternating optical bias is applied to the ring to prevent mode locking and to decrease drift in the system, and whenever the rate of rotation of the ring is equal to or greater than the predetermined rate and hence beyond the mode locking region of the ring laser characteristic, the optical bias is removed from the ring.

As previously described, the laser polarity selector 26 provides a signal representative of the polarity of the pulses of the laser pulse sequence. Whenever the rate of rotation of the ring is less than the predetermined rate, the bias on signal from the inverter 64 of the bias control circuit 30 provides an enabling signal to the AND gate 27.

When, for example, negative bias is applied to the ring, the − bias signal from the AND gate 63 of the bias control circuit 30 provides a binary ONE signal to the AND gate 27 of the laser polarity selector 26. Therefore, when the rate of rotation of the ring is less than the predetermined rate and the applied bias is negative, the AND gate 27 provides a binary ONE signal via the OR gate 29 which signal is representative of the negative polarity of the applied bias. When, however, at the low rates of rotation of the ring, the applied bias is positive, the AND gate 63 of the bias control circuit 30 is disabled thereby providing a binary ZERO signal to the AND gate 27 of the laser polarity selector 26. Thus at the low rates of rotation of the ring and whenever positive bias is applied thereto, the AND gate 27 provides a binary ZERO signal via the OR gate 29, which signal is representative of the positive polarity of the applied bias.

Whenever the rate of rotation of the ring is equal to or greater than the predetermined rate, the bias on signal disables the AND gate 27 and the bias off signal provides an enabling input to the AND gate 28. The AND gate 28 provides the signal representative of the polarity of the laser pulses in accordance with the signal provided by the rate detector 31 at the high rates of rotation of the ring in a manner to be explained with respect to the operation of the rate detector 31.

As previously described, the bias control circuit 30 provides bias control signals to the bias compensation and polarity selection circuits 36. The bias compensation and polarity selection circuits 36 are generally comprised of the Y-registers 38, 39 and 40; the arithmetic unit 41; and the R-register 47 which components together form a conventional integrator circuit of the digital differential analyzer type disclosed in the reference previously cited. The Y-registers 38, 39 and 40 are time shared by the arithmetic unit 41 in a conventional manner.

With the $dx$-input to the arithmetic unit 41 permanently connected to a source of positive voltage, which voltage is representative of a binary ONE signal, the fixed binary numbers selectively provided by the Y-registers 38, 39 and 40 via the OR gate 46 are continuously accumulated in the R-register 47 by the arithmetic unit 41. Thus, the arithmetic unit 41 continuously provides a compensation pulse sequence at the $dz$-output thereof on the conductor 37 in the well known manner of an integrator of the digital differential analyzer type. The compensation pulse sequence thereby provided has a pulse repetition frequency proportional to the magnitudes of the respective binary numbers stored in the registers 38, 39 and 40.

At the low rates of rotation of the ring, the bias on signal from the bias control circuit 30 provides an enabling signal to the AND gates 44 and 45 and the interval 1 signal from the timing signal generator 43 provides a timing signal thereto. The interval 1 signal may be a conventional timing signal for gating the binary numbers stored in the Y-registers 39 and 40 through the AND gates 44 and 45, respectively, during a selected time interval. The alternately occurring +bias signal and −bias signal from the bias control circuit 30 also provide enabling inputs to the AND gates 44 and 45, respectively. Therefore, at the low rates of rotation of the ring, the respective binary numbers stored in the positive bias Y-register 39 and the negative bias Y-register 40 are transmitted respectively through the AND gates 44 and 45, in accordance with the interval 1 signal, to the OR gate 46 in an alternating manner in response, respectively, to the alternately occurring + bias and − bias signals. The OR gate 46, in turn, transmits these numbers to the Y-input of the arithmetic unit 41.

Hence, the registers 39 and 40 provide the respective numbers stored therein, in a conventional manner, to the arithmetic unit 41 in accordance with the control signals provided by the bias control circuit 30 and the timing signals provided by the timing signal generator 43. For example, when positive bias is applied to the ring laser 20 at the low rates of rotation thereof, the binary number stored in the positive bias Y-register 39, which number is representative of the magnitude of the applied positive bias, is transmitted to the Y-input of the arithmetic unit 41 via the AND gate 44 and the OR gate 46 in accordance with the interval 1 signal. Since the $dx$-input of the arithmetic unit 41 has a binary ONE signal permanently applied thereto, the positive bias binary number in the Y-register 39 is repeatedly accumulated in the R-register 47. Thus, a compensation pulse sequence is provided on the conductor 37 by the arithmetic unit 41 whose pulse repetition frequency is representative of the magnitude of the rate of the artificial rotation induced in the ring laser 20 by the positive optical bias applied by the optical bias apparatus 21. In a similar manner, the negative bias Y number stored in the Y-register 40 is selected to provide a compensation pulse sequence on the conductor 37 whose pulse repetition frequency is representative of the magnitude of the rate of artificial rotation induced in the ring laser 20 by the negative bias applied by the optical bias apparatus 21.

A signal representative of the polarity of the compensation pulses provided on the conductor 37, is provided by the *sz* output of the arithmetic unit 41 on the conductor 56 in the conventional manner of a digital differential analyzer integrator of the type utilized in the bias compensation and polarity selection circuits 36 of the present invention. The compensation polarity signal on the conductor 56 is provided in response to the *sx*-polarity input to the arithmetic unit 41. When the applied bias is positive, for example, the binary ONE output from the AND gate 62 of the bias control circuit 30 enables the AND gate 53 of the bias compensation and polarity selection circuits 36 thereby providing a binary ONE signal, which is representative of a negative polarity, to the *sx*-input of the arithmetic unit 41 via the OR gate 55. In a similar manner, when negative bias is applied to the ring laser 20, the binary ZERO signal provided by the AND gate 62 disables the AND gate 53 thereby providing a binary ZERO signal to the *sx*-input of the arithmetic unit 41 which signal is representative of a positive polarity. Thus a polarity opposite to that of the applied bias is selected for the optical bias compensation pulses in accordance with the teachings of the present invention. The AND gate 53 is also enabled in accordance with the interval 1 timing signal thereby providing the respective polarity signals associated with the positive and negative optical bias binary numbers stored respectively in the registers 39 and 40 in the sx-input of the arithmetic unit 41. The arithmetic unit 41, therefore, in a conventional manner, adds the binary number applied to the Y-input thereof to the number stored in the R-register 47 or subtracts the number applied to the Y-input thereof from the number stored in the R-register 47 in accordance with the *sx*-input signal being in the binary ZERO state or the binary ONE state, respectively.

As previously explained, the instrument bias Y-register 38 provides a binary number representative of the instrument zero offset of the ring laser characteristic illustrated in FIG. 1. In a manner similar to that described with respect to the optical bias, the instrument bias binary number is accumulated in the R-register 47 by the arithmetic unit 41 in accordance with the interval 2 signal provided by the timing signal generator 43, thereby contributing to the compensation pulse sequence provided by the arithmetic unit 41 on the conductor 37. Since the instrument zero offset has a magnitude dependent upon the particular ring laser selected for a particular mechanization of the present invention, the magnitude of the instrument bias binary number stored in the Y-register 38 may be fixed in accordance therewith. Similarly, since the polarity of the instrument zero offset may be positive or negative in accordance with the particular ring laser selected, the polarity of the instrument bias compensation pulses may accordingly be set by the switch 52. If the instrument zero offset is negative, for example, the switch 52 may be set to the minus volts position, as indicated by the legend, thereby disabling the AND gate 54 thus providing a binary ZERO signal to the *sx*-input of the arithmetic unit 41 via the OR gate 55. In a similar manner, a binary ONE signal associated with a positive instrument zero offset may be applied to the *sx*-input of the arithmetic unit 41 by setting the switch 52 to the positive volts position. Thus a polarity opposite to that of the instrument zero offset is selected for the instrument compensation pulses in accordance with the teachings of the present invention. The AND gate 54 is also enabled in accordance with the interval 2 timing signal thereby providing the selected polarity signal associated with the instrument bias binary number stored in the register 38.

It may be appreciated that when the rate of rotation of the ring is equal to or greater than the aforementioned predetermined rate, the signal provided by the inverter 64 of the bias control circuit 30 disables the AND gates 44 and 45 thereby discontinuing the generation of the optical bias compensation pulses on the conductor 37. It may furthermore be appreciated that the instrument zero offset is a fixed and undesired characteristic of a particular ring laser utilized to instrument the system of the present invention. Therefore, during both the high and the low rates of rotation of the ring the instrument bias Y-register 38 provides the instrument bias binary number to the arithmetic unit 41 which continuously accumulates this number in the R-register 47 in accordance with the interval 2 timing signal and the preset position of the switch 52. Therefore, the instrument bias compensation pulses are provided on the conductor 37 irrespective of the magnitude of the rate of rotation of the ring and the instrument bias compensation polarity signal associated therewith is provided on the conductor 56.

It may furthermore be appreciated that because of the alternating characteristic of the + bias and the − bias control signals and because of the non-overlapping characteristic of the interval 1 and the interval 2 timing signals, binary numbers from the Y-registers 38, 39 and 40 will never simultaneously be applied to the arithmetic unit 41 thus precluding erroneous applications of the Y-binary numbers thereto.

The reason for utilizing separate positive and negative bias Y-registers 39 and 40 will now be explained. It is desired when optical bias is applied to the ring laser 20 by the optical bias apparatus 21, that the magnitude of the current flow through the optical bias apparatus 21 be maintained constant irrespective of the polarity of the bias applied. Constant bias current is desirable in ring laser systems because the optical bias apparatus 21 is usually located internal to the temperature sensitive optical cavity of the ring laser 20. Temperature gradients, which may be caused by the differences in the magnitude of current flow through the optical bias apparatus 21, may seriously distort the critical optical dimensions of the cavity thus introducing errors. Maintaining the magnitude of the current flow constant, however, introduces an additional problem. Because of asymmetries inherent in optical biasing apparatus, the applied positive optical bias may differ from the applied negative optical bias for energizing currents of the same magnitude. Therefore, positive and negative Y-binary numbers that are different with respect to each other are required in accordance with the different positive and negative optical bias provided by the optical bias apparatus 21 in response to the current flow of constant magnitude.

As previously discussed, the laser pulse sequence, the laser pulse sequence polarity signal, the compensation pulse sequence and the compensation pulse sequence polarity signal provide inputs to the pulse sequence combining circuit 66. The pulse sequence combining circuit 66 provides a signal on the conductor 67 representative of singly occurring laser or compensation pulses and provides a signal on the conductor 68 representative of the polarity associated therewith. The pulse sequence combining circuit 66 furthermore provides a signal on the conductor 67 representative of one pulse of simultaneously occurring laser and compensation pulses having the same polarity with respect to each other and provides a signal on the conductor 68 representative of the polarity thereof. The pulse sequence combining circuit 66 stores the other pulse of the pair of simultaneously occurring laser and compensation pulses with its associated polarity signal and thereafter transmits the stored pulse and the stored polarity signal on the conductors 67 and 68 respectively. Whenever two simultaneously occurring laser and compensation pulses have opposite polarities with respect to each other, the pulses are cancelled and a signal is not transmitted on the conductor 67.

Whenever a single laser pulse or a single compensation pulse occurs, the AND gates 86 and 88 are respectively enabled. The enabled AND gate 86 or the enabled AND gate 88 may provide a binary ONE signal on the conductor 67 via the OR gates 73 and 74. When, for example, a single positive laser pulse occurs, the binary ZERO polarity signal from the laser polarity selector 26 disables the AND gate 90 thereby providing a binary ZERO signal on the conductor 68 via the OR gates 91 and 85 and the AND gate 92. This binary ZERO signal is representative of the positive polarity of the laser pulse. When, however, the polarity of the singly occurring laser pulse is negative, the binary ONE polarity signal from the laser polarity selector 26 enables the AND gate 90 thereby providing a binary ONE signal on the conductor 68, which signal is representative of the negative polarity of the laser pulse. In a similar manner, whenever a single bias compensation pulse occurs, the compensation polarity signal on the conductor 56 disables or enables the AND gate 98, in accordance with the pulse polarity being positive or negative, respectively, thereby providing a binary ZERO or a binary ONE signal respectively on the conductor 68.

Whenever a laser pulse and a bias compensation pulse occur simultaneously with respect to each other and have the same polarity with respect to each other, the AND gate 69 or the AND gate 72 is enabled when the associated polarity is positive or negative respectively. When either the AND gate 69 or the AND gate 72 is enabled, a binary ONE signal is provided on the conductor 67 via the OR gates 73 and 74 which signal is representative of one pulse of the pair of simultaneously occurring pulses. If the simultaneously occurring pulses are negative, the binary ONE signal provided by the AND gate 72 is transmitted to the conductor 68 via the OR gates 85 and 91 and the AND gate 92. This signal, on the conductor 68, is representative of the negative polarity. If, however, the two simultaneously occurring pulses are positive, the binary ZERO signal from the AND gate 72 is similarly transmitted to the conductor 68 via the OR gates 85 and 91 and the AND gate 92.

Whenever the two simultaneously occurring pulses have the same polarity with respect to each other, and either the AND gates 69 or 72 is enabled as previously explained, the OR gate 77 is also enabled, which in turn sets the flip flop 78 to the Q state in response to the $t_0$ signal on the T input thereof. Thus the flip flop 78 is caused effectively to store the other pulse of the pair of simultaneously occurring pulses. If the pair of simultaneously occurring pulses is positive, the flip flop 79 is set to the Q state, and if the pair of simultaneously occurring pulses is negative, the flip flop 79 is set to the $\bar{Q}$ state. Thus the flip flop 79 is caused to store the polarity of the other pulse of the pair of simultaneously occurring pulses.

When the first pulse of the pair of simultaneously occurring pulses is being transmitted through the OR gate 73 to the conductor 67, the OR gate 73 provides an inhibiting signal to the AND gates 75 and 76 via the inverter 80. This inhibiting signal prevents the pulse stored in the flip flop 78 from being transmitted through the AND gate 75 and prevents the polarity signal stored in the flip flop 79 from being transmitted through the AND gate 76 while the first pulse of the pair of pulses exists on the conductor 67. During the time that this first pulse exists, the OR gate 73 provides an enabling signal to the AND gate 92 thereby permitting the polarity signal associated with this first pulse to be transmitted therethrough to the conductor 68.

After the first pulse of the pair of simultaneously occurring pulses has been transmitted through the OR gate 73 to the conductor 67, the OR gate 73 enables the AND gates 75 and 76 and disables the AND gate 92. The second pulse of the pair of pulses which second pulse is stored in the flip flop 78 is then transmitted through the AND gate 75 to the conductor 67 via the OR gate 74. This second pulse, transmitted through the AND gate 75, is also utilized to reset the flip flop 78 back to the $\bar{Q}$ state. In a similar manner, the polarity signal associated with this second pulse, which polarity signal is stored in the flip flop 79, is transmitted through the AND gate 76 to the conductor 68 via the OR gate 85. Since the AND gate 92 is, at this time, disabled by the signal from the OR gate 73, erroneous polarity signals are blocked from being transmitted to the OR gate 85 and hence to the conductor 68.

It is to be appreciated that since the polarity of the optical bias compensation pulses is selected opposite to that of the bias applied to the ring, in accordance with the teachings of the present invention, whenever a simultaneously occurring laser pulse and bias compensation pulse have the same polarity with respect to each other that the bias compensation pulse is an instrument bias compensation pulse.

As previously discussed, the pulse sequence combining circuit 66 provides the combined pulse sequence on the conductor 67 and the combined polarity signal associated therewith on the conductor 68. The conductors 67 and 68 provide signals to the $dx$ and $sx$-inputs respectively of the scaling integrator 93. The scaling integrator 93 scales the combined pulse sequence in accordance with the combined polarity signal, in a conventional manner thereby providing a scaled combined pulse sequence and an associated polarity signal at the $dz$ and the $sz$-outputs thereof respectively. The scaling factor may be chosen so that the pulse sequence provided by the scaling integrator 93 to the following sine-cosine computation circuit 94 may be utilized directly thereby without requiring further scaling in the integrators associated therewith.

The scaling integrator 93 provides the scaled combined pulse sequence and the polarity signal associated therewith to the rate detector 31 via the dz and sz-outputs thereof respectively. The rate detector 31 provides a signal on the conductor 97 to the bias control circuit 30 which signal is representative of the condition wherein the magnitude of the rate of rotation of the ring equals or exceeds the aforementioned predetermined magnitude. The rate detector 31 also provides a signal to the laser polarity selector 26 which signal selects the polarity of the laser pulse sequence at the high rates of rotation of the ring.

The timing signal $T_1$ periodically triggers the flip flop 104 at a rate which may, for convenience, be 122 Hertz. The binary information provided to the set and reset inputs of the flip flop 104 from the AND gate 103 is thus periodically entered thereinto by the $T_1$ signal. The $T_1$ signal is also utilized to reset the counter 95 to a reference value which may, for convenience, by zero, For reasons to be explained, conventional delaying means, not shown, are included in the counter 95 for delaying the resetting thereof until the binary information has been entered into the flip flop 104 by the $T_1$ signal.

Whenever the counter 95 is reset to zero by the $T_1$ signal and the flip flop 104 is in the $\bar{Q}$ state, the AND gate 130 provides an enabling signal to the AND gates 131 and 132. The enabled AND gates 131 and 132 then enter the polarity information provided by the sz-output of the scaling integrator 93 into the flip flop 108 in response to the trigger pulses applied to the trigger input thereof. If the sz-signal is in the binary ZERO state, which is representative of a positive polarity, the flip flop 108 is set to the $\bar{Q}$ state. If the sz-signal is in the binary ONE state, which is representative of a negative polarity, the flip flop 108 is set to the Q state.

The counter 95 is controlled to count up or down by a binary ZERO or a binary ONE signal respectively applied to the up-down control input 107, as previously explained. The up-down control signal is provided in accordance with the polarity of the sz-signal from the scaling integrator 93 and the state of the flip flop 108 via the gates 134, 135, 136, and 137. These gates are interconnected so that the reversible counter 95 is not permitted to count down through zero as previously explained. Instead, whenever the counter 95 attains a count of zero by counting down from a larger number, the binary signal on the conductor 107 is reversed, in a manner to be explained, so that the counter 95 reverses its direction of count and commences counting up therefrom. The counter 95 is thus constrained from counting down through the number zero for the reasons previously explained.

Considering now that the ring laser 20 is rotating at a rate whose magnitude is less than the aforementioned predetermined magnitude, the $T_1$ signal continuously resets the counter 95 back to zero before it can attain the aforementioned predetermined count. Therefore, the AND gate 103 remains continuously disabled thereby providing binary information to the flip flop 104 which causes it to be continuously set to the $\bar{Q}$ state in response to the $T_1$ signal. The flip flop 104, therefore, provides a bias on signal, via the conductor 97, to the bias control circuit 30 and hence to the laser polarity selector circuit 26 as previously explained.

The AND gate 130 is consequently periodically enabled thereby periodically entering the sz polarity information from the scaling integrator 93 into the flip flop 108. As previously explained, when the polarity signal is positive, for example, the flip flop 108 is set to the $\bar{Q}$ state. In accordance with this condition, both the AND gates 134 and 135 are disabled thereby providing a binary ZERO count-up control signal to the reversible counter 95. Similarly, when the polarity signal provided by the scaling integrator 93 is negative, the flip flop 108 is set to the Q state thus again disabling both the AND gates 134 and 135 and thus again providing a count-up signal to the counter 95. Thus it can be seen that after the counter 95 is reset to zero, it will count up irrespective of the polarity signal provided by the scaling integrator 93.

Considering still that the magnitude of the rate of rotation of the ring laser 20 is less than the aforementioned predetermined magnitude, should the polarity signal from the scaling integrator 93 reverse while the counter 95 is counting up, the count-up control signal on the conductor 107 will similarly reverse, hence causing the counter 95 to begin counting down. Should the counter attain a zero count when counting down, the AND gate 130 will be enabled hence causing the flip flop 108 to change state in response to the reversed polarity signal thereby reversing the up-down control signal on the conductor 107 causing the counter 95 to begin counting up again. Thus it can be seen that the reversible counter 95 will count in a numerical range equal to or greater than zero and less than the aforementioned predetermined count at the low rates of rotation of the ring.

Consider now the condition wherein the magnitude of the rate of rotation of the ring equals or exceeds the aforementioned predetermined magnitude. The counter 95, which is periodically being reset to a count of zero by the $T_1$ signal, now attains the predetermined count during a resetting period thus enabling the AND gate 103. The enabled AND gate 103 provides a disabling signal via the inverter 106 to the AND gate 96 hence blocking transmission to the counter 95 of further pulses. Hence the counter 95 stops counting upon attaining the predetermined count. The next occurring $T_1$ timing pulse sets the flip flop 104 to the Q state and thereafter resets the reversible counter 95 back to zero. The resetting of the counter 95 must be slightly delayed with respect to the setting of the flip flop 104 so that the binary information provided by the AND gate 103 is properly entered thereinto. The Q output of the flip flop 104 provides the high rate bias off signal on the conductor 97 to the bias control circuit 30 and hence to the laser polarity selector 26. The $\bar{Q}$ output of the flip flop 104 then disables the AND gate 130 thus preventing the flip flop 108 from changing state in response to further pulses applied to its trigger input. The flip flop 108 is thus caused to store a signal representative of the polarity signal provided by the scaling integrator 93 when the reversible counter 95 attains the aforementioned predetermined count. Hence the flip flop 108 provides the high rate laser polarity signal to the laser polarity selector 26.

The reversible counter 95, which is now reset to zero, reenables the AND gate 103 which in turn re-enables the AND gate 96. Hence the counter 95 again commences to count the pulses of the scaled combined pulse sequence from the scaling integrator 93 in an upward direction. If the magnitude of the rate of rotation of the ring still equals or exceeds the predetermined magnitude, the described cycle is repeated and the flip flops 104 and 108 continue to provide the bias off signal and the high rate laser polarity signal respectively. If, however, the magnitude of the rate of rotation of the ring has decreased to less than the predetermined magnitude, the AND gate 103 will no longer be enabled and the $T_1$ signal will reset the flip flop 104 back to the $\bar{Q}$ state, hence again providing the bias on signal on the conductor 97 as previously explained.

As previously discussed, the scaling integrator 93 provides the scaled combined pulse sequence and the polarity signal associated therewith to the sine-cosine computation circuit 94 and the rate computation circuit 113. As previously described, the sine-cosine computation circuit 94 is a conventional digital differential analyzer for providing the sine and the cosine of the angular attitude of the ring laser 20 with respect to a reference position. Similarly, the rate computation circuit 113, as previously described, is a conventional digital differential analyzer for providing a binary number representative of the sense and magnitude of the rate of rotation of the ring laser 20.

The over-all operation of the computer illustrated in FIG. 2 will now be considered. The ring laser 20 provides three contributions to the laser pulse sequence. The first contribution consists of pulses resulting from the mechanical rotation of the ring about an axis normal thereto. The second contribution consists of pulses resulting from the applied optical bias and the third contribution consists of pulses resulting from the instrument zero offset.

The bias compensation and polarity selection circuits 36 provide two contributions to the bias compensation pulse sequence. The first contribution consists of pulses equal in number to the pulses contributed to the laser pulse sequence by reason of the applied optical bias and the second contribution consists of pulses equal in number to the pulses contributed to the laser pulse sequence by reason of the instrument zero offset.

When the applied optical bias is positive, the laser polarity selector circuit 26 assigns a positive polarity to the pulses of the laser pulse sequence, which polarity is conveniently represented by a binary ZERO signal in the disclosed embodiment of the present invention. Similarly, the bias compensation and polarity selection circuits 36 assign a negative polarity to the pulses contributed to the bias compensation pulse sequence to compensate for the applied optical bias. This polarity is conveniently represented by a binary ONE signal. The laser and optical bias compensation polarities are selected under control of the bias control circuit 30.

Conversely, when the applied optical bias is negative, a negative polarity is assigned to the laser pulses and a positive polarity is assigned to the optical bias compensation pulses in the manner described with respect to the positive optical bias.

The polarity of the instrument bias compensation pulses is preset opposite to the fixed polarity of the instrument zero offset by the switch 52.

The laser pulse sequence and the bias compensation pulse sequence are applied to the pulse sequence combining circuit 66. As previously described, the pulse sequence combining circuit 66 transmits singly occurring laser or compensation pulses and the polarity signals associated therewith. The pulse sequence combining circuit 66 furthermore transmits both pulses of each pair of simultaneously occurring laser and compensation pulses having the same polarity with respect to each other and transmitting the polarity signal associated therewith. Pairs of simultaneously occurring laser and compensation pulses having opposite polarities with respect to each other are cancelled by the pulse sequence combining circuit 66. Hence, the pulse sequence combining circuit 66 cancels a number of laser pulses resulting from the applied optical bias and a number of laser pulses resulting from the instrument zero offset and corresponding numbers of optical bias compensation pulses and instrument compensation pulses, respectively. The remaining pulses provide the combined pulse sequence on the conductor 67 and the associated combined polarity signal associated therewith is provided on the conductor 68. It may hence be appreciated that the combined pulse sequence comprises intercurrent laser and compensation pulses and that the combined polarity signal comprises corresponding intercurrent positive and negative signals.

The combined pulse sequence is scaled and the scaled combined pulse sequence is applied to the sine-cosine computation circuit 94 and to the rate computation circuit 113 along with the associated combined polarity signals. The sine-cosine computation circuit 94 and the rate computation circuit 113 are conventional digital differential analyzers comprising integrator circuits of the type previously cited. The scaled combined pulse sequence, as previously explained, comprises laser pulses resulting from mechanical rotation of the ring, the applied optical bias and the instrument zero offset; the laser pulses having a selected polarity. The scaled combined pulse sequence further includes optical bias compensation pulses having a polarity selected opposite to that of the laser pulses and instrument bias compensation pulses having a preset polarity selected opposite to that of the instrument zero offset. The integrators of the digital differential analyzers, hence, integrate the pulses of the scaled combined pulse sequence in accordance with the polarity signals associated therewith, thus providing data from which the effect of the applied optical bias and the instrument zero offset have been removed. The data provided by the sine-cosine computation circuit 94 and the rate computation circuit 113, therefore, are respective of the magnitude and polarity of the mechanical rotation of the ring laser 20 about its sensitive axis.

The scaled combined pulse sequence and the polarity signals associated therewith are also applied to the rate detector 31. The reversible counter 95 of the rate detector 31 counts up when the pulse applied thereto is of one polarity and counts down when the applied pulse is of the other polarity within the constraint of not counting down through zero as previously described. Thus, the counter 95 provides a binary number representative of the number of laser pulses resulting from the mechanical rotation of the ring that occur within the resetting interval of the counter 95. The binary number thus provided is representative of the magnitude of the rate of rotation of the ring. The AND gate 103, therefore, detects when the magnitude of the rate of rotation of the ring equals or exceeds the aforementioned predetermined magnitude thus providing the high rate signal on the conductor 97 to the bias control circuit 30.

At the high rates of rotation of the ring, the bias control circuit 30 de-energizes the optical bias apparatus 21 and inhibits the optical bias compensation pulses from transmission to the pulse sequence combining circuit 66 in response to the signal on the lead 97. The flip flop 108 of the rate detector 31 provides the laser polarity signal, via the laser polarity selector 26, during the high rates of rotation of the ring, as previously described.

At the low rates of rotation of the ring, the bias control circuit 30 energizes the optical bias apparatus 21, enables the optical bias compensation pulses for transmission to the pulse sequence combining circuit 66 and selects the laser and compensation polarities via the laser polarity selector 26 and the bias compensation and polarity selection circuits 36, respectively, as previously described. The polarity of the applied bias may be continuously alternated, at the low rates of rotation, to reduce long-term drift errors in the manner well known in the ring laser art. The laser and compensation polarities may be correspondingly alternated, thus continuously providing signals from the computer of the present invention representative of the magnitude and the sense of the rate of rotation of the ring about its sensitive axis.

It may be appreciated that the computer of the present invention may provide navigational data with respect to a vehicle in which the ring laser 20 may be fixedly mounted. The sensitive axis of the ring may be aligned with one of the major axes of the vehicle, for example with the pitch axis of the craft. The sine-cosine computation circuit 94 may then, for example, provide signals representative of the sine and the cosine of the pitch displacement of the craft with respect to a reference position.

It may thus further be appreciated that the computer of the present invention is particularly suited to providing navigational data in a three-axis navigational system which may compute, for example, the basic direction cosines of the vehicle navigating with respect to a reference frame fixed in space. It will be appreciated that in the above specification the terms $sx$, $sy$, $sz$ represent the polarities of the respective $dx$, $dy$, $dz$ signals and may alternatively be designated as $S_x$, $S_y$, $S_z$ respectively.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a ring laser rotational rate sensor system for measuring the rate and direction of rotation of the ring about an axis normal thereto including a ring laser having contrarotating beams and biasing means for selectively changing the effective optical path length around said ring of one of said beams with respect to the other, said ring laser providing a laser pulse sequence whose pulse repetition frequency is representative of the difference in oscillation frequency between said beams:

laser polarity selection means for providing a first polarity signal representative of a polarity associated with said laser pulse sequence, compensation means for providing a bias compensation pulse sequence whose pulse repetition frequency is representative of the change in said effective optical path length effected by said biasing means, compensation polarity selection means for providing a second polarity signal representative of a polarity associated with said bias compensation pulse sequence and selected of opposite polarity to that of said first polarity signal, and pulse sequence combining means responsive to said laser pulse sequence, first polarity signal, bias compensation pulse sequence and second polarity signal for providing a combined pulse sequence and a combined polarity signal in accordance therewith.

2. In the system recited in claim 1 in which said pulse sequence combining means comprises means for inhibiting each said laser pulse and each said bias compensation pulse that occur simultaneously with respect to each other and have opposite associated polarities with respect to each other and transmitting each said laser pulse and each said bias compensation pulse that occur separately with respect to each other thereby providing said combined pulse sequence and for transmitting the polarity signal associated with each said transmitted pulse thereby providing said combined polarity signal.

3. In the system recited in claim 1 in which said laser polarity selection means includes means for selecting the polarity of said first polarity signal in accordance with the polarity of said bias.

4. In the system recited in claim 3 in which said compensation means includes means for selectively providing a plurality of bias compensation pulse sequences.

5. In the system recited in claim 4 further including bias control means for providing signals to said biasing means for alternately reversing said polarity of said bias.

6. In the system recited in claim 3 in which said compensation means includes means for selectively providing first and second bias compensation pulse sequences in accordance with said polarity of said bias.

7. In the system recited in claim 6
further including bias control means for providing bias control signals;
said biasing means, said means for selecting the polarity of said first polarity signal in accordance with the polarity of said bias, said means for selectively providing first and second bias compensation pulse sequences in accordance with said polarity of said bias and said compensation polarity selection means for controlling said polarity of said bias being responsive to said control signals for selecting the polarity of said first polarity signal, for selectively providing said first and second bias compensation pulse sequences and for selecting the polarity of said second polarity signal, respectively.

8. In the system recited in claim 7 in which said bias control means further includes means for alternately reversing said bias control signals to alternately reverse said polarity of said bias, alternately reverse said polarities of first and second polarity signals, and alternately select said first and second bias compensation pulse sequences.

9. In the system recited in claim 6 in which
said compensation means further includes means for providing to said pulse sequence combining means and instrument compensation pulse sequence whose pulse repetition frequency is representative of the zero offset of the response curve of said ring laser, and
said compensation polarity selection means further includes instrument compensation polarity selection means for providing to said pulse sequence combining means a signal representative of a predetermined instrument compensation polarity associated with said instrument compensation pulse sequence.

10. In the system recited in claim 9 in which said compensation means comprises an integrator of the digital differential analyzer type wherein predetermined numbers stored in respective Y-registers associated with said integrator are selectively accumulated in the R-register associated therewith thereby providing respectively said first bias compensation pulse sequence, said second bias compensation pulse sequence and said instrument compensation pulse sequence.

11. In the system recited in claim 9 in which said pulse sequence combining means comprises means for inhibiting each said laser pulse and each said bias compensation pulse that occur simultaneously with respect to each other and have opposite associated polarities with respect to each other and transmitting each said laser pulse and each said bias compensation pulse that occur separately with respect to each other thereby providing said combined pulse sequence and for transmitting the polarity signal associated with each said transmitted pulse thereby providing said combined polarity signal.

12. In the system recited in claim 9 in which said pulse sequence combining means further includes
means responsive to said laser pulse sequence and to said instrument compensation pulse sequence for inhibiting each said laser pulse and each said instrument compensation pulse that occur simultaneously with respect to each other and have opposite associated polarities with respect to each other,
means responsive to said laser pulse sequence and to said instrument compensation pulse sequence for transmitting one pulse of simultaneously occurring laser and instrument compensation pulses having the same associated polarities with respect to each other thereby providing a pulse of said combined pulse sequence,
means for storing the other pulse of said simultaneously occurring laser and instrument compensating pulses having the same associated polarities with respect to each other and for thereafter transmitting said other pulse thereby providing a pulse of said combined pulse sequence, and
means for storing the polarity signal associated with said other pulse and for transmitting said polarity signal associated therewith concurrently with the transmission of said other pulse.

13. In the system recited in claim 1 further including
first computation means coupled to said pulse sequence combining means and responsive to said combined pulse sequence and said combined polarity signal for providing signals in accordance therewith representative of the sine and cosine of the angular displacement of said ring about said axis normal thereto, and
second computation means coupled to said pulse sequence combining means and responsive to said combined pulse sequence and said combined polarity signal for providing a digital signal in accordance therewith representative of the angular velocity of said ring about said axis normal thereto.

14. In the system recited in claim 13 in which said first and second computation means comprise integrator circuits of the digital differential analyzer type.

15. In the system recited in claim 1 further including bias control means for providing bias control signals to said biasing means for energization and de-energization thereof.

16. In the system recited in claim 15 further including rate detector means responsive to said combined pulse sequence and said combined polarity signal for providing a de-energizing signal and a rate detector polarity signal whenever the magnitude of said rate of rotation exceeds a predetermined magnitude,
said rate detector polarity signal being representative of said direction of rotation of said ring about said axis normal thereto when the magnitude of said rate of rotation exceeds said predetermined magnitude,
said bias control means being responsive to said de-energizing signal for de-energizing said biasing means,
said laser polarity selection means including means responsive to said de-energizing signal and said rate detector polarity signal for providing said first polarity signal in accordance with said rate detector polarity signal, and
said compensation means being responsive to said de-energizing signal for inhibiting said bias compensation pulse sequence from transmission to said pulse sequence combining means.

17. In the system recited in claim 16 in which said rate detector means comprises
a reversible pulse counter for counting the pulses of said combined pulse sequence selectively in an upward or downward direction in accordance with said combined polarity signal,
means for periodically resetting said counter,
means coupled to said counter for detecting a predetermined count to provide said de-energizing signal whenever said counter attains said predetermined count during said resetting period, and
storage means responsive to said combined polarity signal for storing the polarity signal associated with the pulse of said combined pulse sequence that caused said counter to attain said predetermined count thereby providing said rate detector polarity signal.

18. In the system recited in claim 1 further including scaling means responsive to said combined pulse sequence and said combined polarity signal for multiplying said combined pulse sequence in accordance with said combined polarity signal by the desired scale factor thereby providing a signal representative of said rate and direction of rotation of said ring about said axis normal thereto.

19. In the system recited in claim 18 in which said scaling means comprises an integrator of the digital differential analyzer type wherein a predetermined binary number representative of the desired scale factor is stored in the Y-register associated with said integrator.

20. In the system recited in claim 1 further including integrating means responsive to said combined pulse sequence and combined polarity signal for integrating said combined pulse sequence in accordance with said combined polarity signal thereby providing a signal representative of said rate and direction of rotation of said ring about said axis normal thereto.

21. In the system recited in claim 20 in which said integrating means further includes
first computation means for providing signals representative of the sine and the cosine of the angular displacement of said ring about said axis normal thereto, and
second computation means for providing a digital signal representative of the angular velocity of said ring about said axis normal thereto.

22. In the system recited in claim 21 in which said first and second computation means comprise integrator circuits of the digital differential analyzer type.

* * * * *